Dec. 18, 1956   H. L. GRAEVENITZ ET AL   2,774,121
JOINT FOR STRUCTURAL SECTIONS
Filed Feb. 24, 1951   2 Sheets-Sheet 1
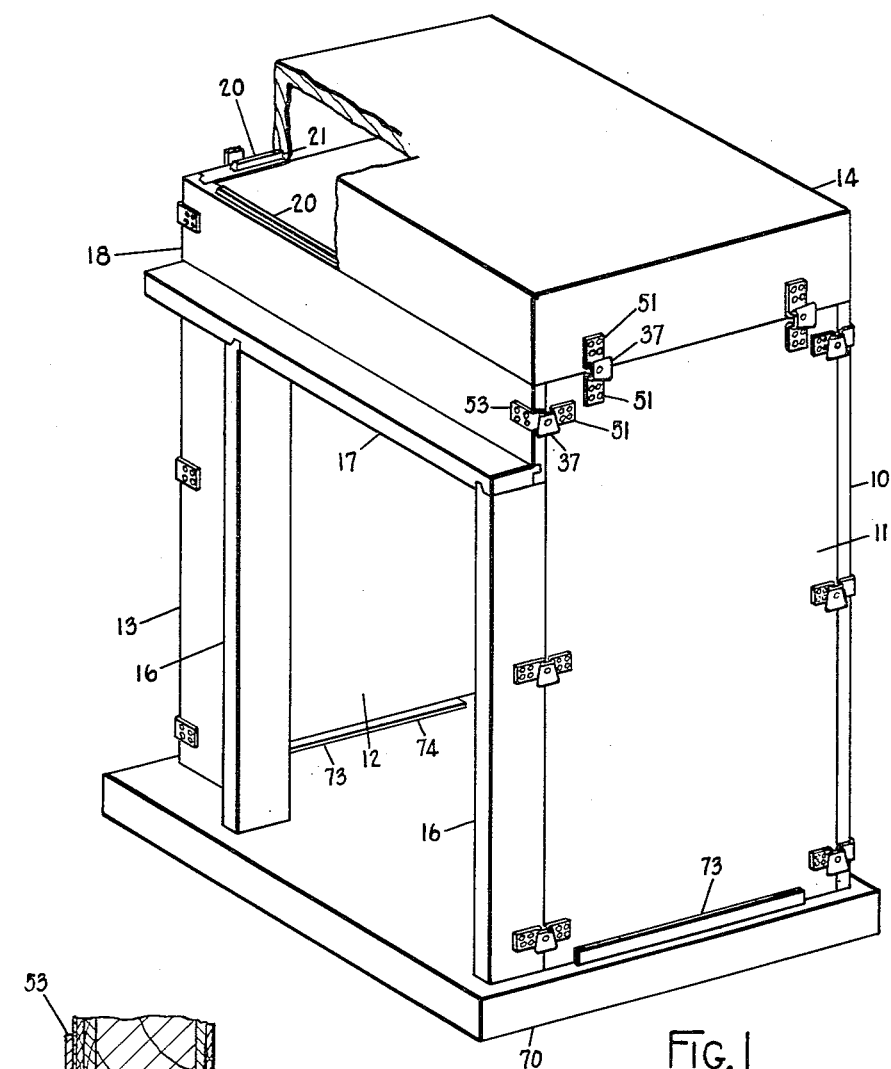
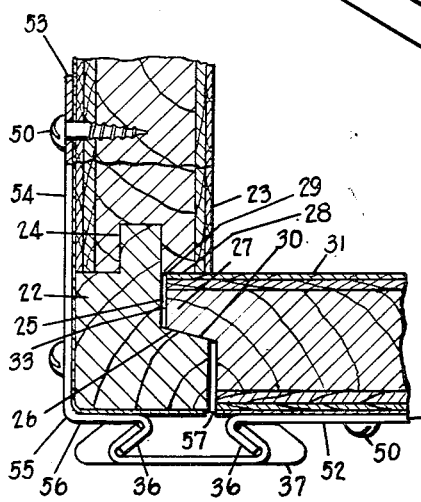
HENRY LUDWIG GRAEVENITZ
FREDERICK STANLEY DUNHAM } INVENTORS
BY /L. Sharon ATTORNEY Dec. 18, 1956    H. L. GRAEVENITZ ET AL    2,774,121
JOINT FOR STRUCTURAL SECTIONS
Filed Feb. 24, 1951    2 Sheets-Sheet 2
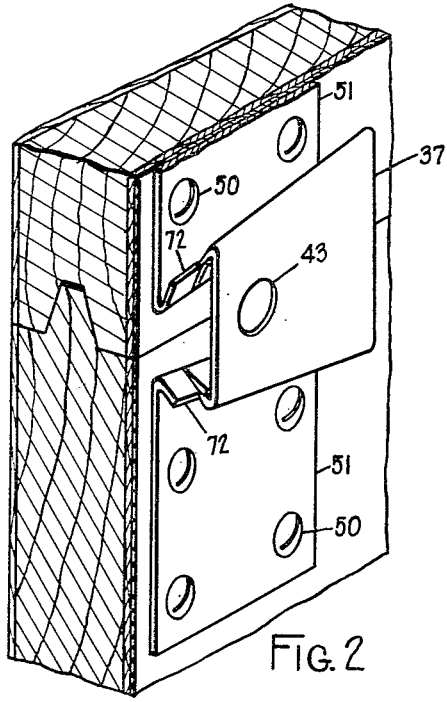
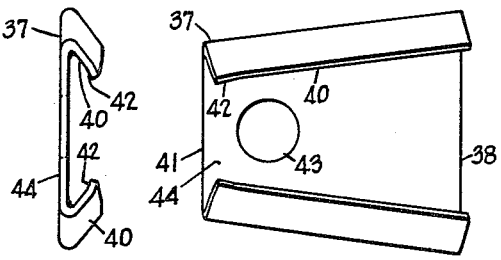
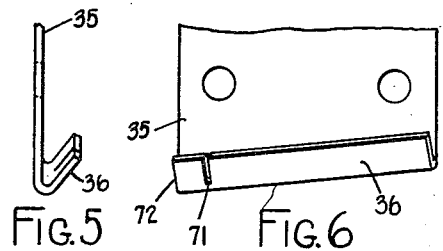
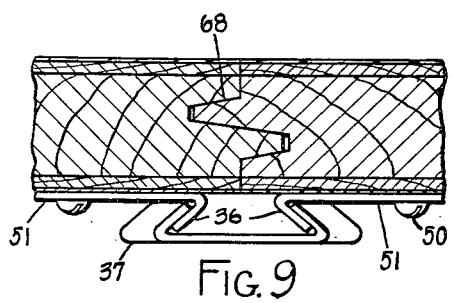
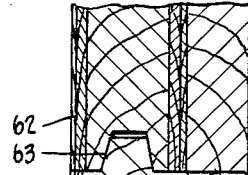
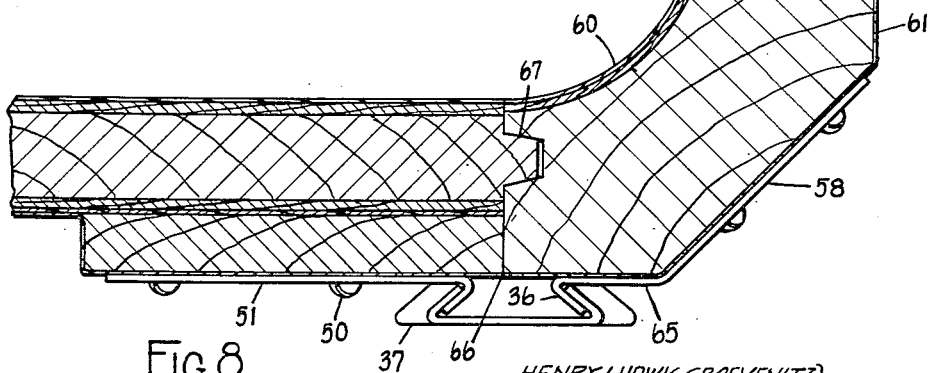
HENRY LUDWIG GRAEVENITZ
FREDERICK STANLEY DUNHAM  INVENTORS
BY  J. L. Sharon  ATTORNEY

United States Patent Office 2,774,121
Patented Dec. 18, 1956

2,774,121

JOINT FOR STRUCTURAL SECTIONS

Henry Ludwig Graevenitz and Frederick Stanley Dunham, East Orange, N. J., assignors to Otis Elevator Company, New York, N. Y., a corporation of New Jersey Application February 24, 1951, Serial No. 212,618

3 Claims. (Cl. 20—92)

The invention relates to joints for sections of structures, especially those of the prefabricated type.

There are various structures which are made up of a plurality of adjoining sections to be secured together. One example of such a structure is the cab of an elevator car. An elevator cab is made up of a group of panels forming the front, sides and rear of the car, the front panel being framed to provide an entrance. Also a canopy is provided which is secured to the panels after they are in place. These various sections are fabricated in the shop and are assembled on the car platform in the elevator hoistway. The cabs may be of metal or wood. It is important that the fastening devices used be readly adaptable to the close quarters inherent in making the assembly on the job. It is also important that these sections be firmly secured together and provide a tight fit. This is especially true of wood cabs, not only because of rigidity but to obviate any noise which might be caused by poor joinder. Also a tight fit presents a pleasing appearance. The invention is particularly directed to elevator cabs, but it is to be understood that it is applicable to structures of other forms.

The principal object of the invention is to provide a joint which is of simple construction, which readily can be put together and which forms and maintains a rigid construction.

The invention is especially advantageous for sections which are arranged at an angle with respect to each other. In carrying out the invention as applied to a right angle corner formation, the edge of one section abuts the inner face of the other section at the edge thereof. A tongue and groove are formed on the mating surfaces. According to the preferred arrangement, the tongue which is formed on the abutting edge of such one section has one side flush with the inner surface of that section with the other side beveled. A groove is formed in the inner surface of the other section at the edge to receive the tongue, the side of the groove opposite the inner surface of the section having the tongue being flush therewith and its other side being beveled to conform to the tongue. A wedge-like clamp is utilized to draw the tongue into the groove and on being so drawn the beveled surfaces force the flush side of the tongue against the flush side of the groove to provide a tight fit, sufficient clearance being provided in the groove to prevent bottoming. In the preferred construction, the clamp is made up of a tapered clip which fits onto a pair of reciprocally formed brackets. The brackets are secured to adjacent sections on each side of the line of joinder. The clip is formed from a plate having its edges at a converging angle, these edges being bent inwardly upon themselves. The brackets have their adjacent edges at angles corresponding to those of the plate from which the clip is formed. These edges are bent outwardly upon themselves to receive the clip. The bracket secured to the section having the groove is bent to conform to the corner. In assembling the sections, the clips are slid onto the brackets and driven into place, thereby providing a wedge-like action for clamping the sections together. The invention will be described as applied to a wood elevator cab.

Features and advantages of the invention will be seen from the above statements and from the description which follows and appended claims.

In the drawings:

Figure 1 is a schematic view in perspective of an elevator cab embodying the invention;

Figure 2 is an enlarged sectional detail in perspective illustrating a clip in place on brackets, securing two cab sections together in abutting relation;

Figure 3 is an end view of the clip of Figure 2;

Figure 4 is a plan view of the same;

Figure 5 is an end view of the upper bracket of Figure 2;

Figure 6 is a plan view of the same;

Figure 7 is a fragmental detail in cross section illustrating the securing of adjacent panels together at a right angle corner;

Figure 8 is a similar view for a rounded corner; and

Figure 9 is a detail in section illustrating an arrangement suitable for the condition where a cab panel is arranged in two sections.

Referring first to Figure 1, the cab is made up of a rear panel 10, two side panels 11 and 12 and a front panel 13. These panels are of laminated wood construction which may be backed with thin metal sheets if desired. A wood canopy 14 is illustrated which also may be of a laminated construction. The cab is fabricated in the shop and then disassembled and shipped to the job where it is to be installed. In fabricating the cab, the various panels are cut to size. The front panel is made up of several parts to form an entrance, these parts including the jambs 16, lintel 17 and facia 18 secured together in any suitable manner. Also the various parts (not indicated) constituting the canopy are secured together in any suitable manner. It is preferred to fit the canopy onto the panels by forming on the top of the side panels, rear panel and facia beveled tongues 20 for fitting into beveled grooves 21 formed in the bottom edges of the sides of the canopy.

Where the cab has square corners, the rear panel is formed with a solid wood corner piece 22 at each side which is glued to the plywood section 23 with a tongue and groove joint 24, as shown in Figure 7. Each corner piece is formed with a longitudinal groove 25 on the front of the panel adjacent the plywood section and having a beveled side 26. The front panel is also formed with a solid wood piece at the side where the corner is formed and is there provided with a beveled groove. The corners at the facia are similarly formed. These beveled grooves are to receive tongues 27 formed on the edges of the side panels. Each tongue has its side 28 flush with the inner face 31 of the panel. The side 29 of each groove is flush with the inner side of the side panel. A beveled side 30 is formed on each tongue for engaging the beveled side 26 of the groove to force the inner face 31 of the side panel against the edge of the plywood section which forms side 29 of the groove when the tongue is drawn into the groove. Sufficient clearance is provided in the bottom 33 of each groove to insure a tight fit. The grooves 21 in the canopy are also formed with sufficient clearance to provide a tight fit.

After these sections have been fabricated, they are assembled in the shop and are secured in place by the clips and brackets. The brackets are formed from flat plates 35. The plates of the pair of brackets which receive the clip have their adjacent edges formed at a converging angle, these edges being bent outwardly upon themselves as indicated at 36 in Figures 7, 8 and 9 to form when secured to the cap a tapered dovetail. The bent construction of the edge of one of the brackets may be seen from Figures 5 and 6. The clips 37 are of the construction illustrated in Figures 3 and 4. Each clip is formed from a flat plate having its edges extending at a converging angle with respect to the end 38 to correspond with the angle of the brackets. These edges are bent inwardly upon themselves as indicated at 40 to form a tapered clamp which fits upon the brackets. At the narrow end 41, the edges are further bent in slightly, as indicated at 42, to aid in retaining the clips in place. Also a hole 43 may be provided in the back 44 of the clip.

The brackets are secured to the adjoining panel sections as by screws 50. Where the brackets are employed for securing adjoining panels together at a corner, one of them designated 51 is secured to the side panel and has its body portion 52 flat. The other bracket is secured to the other panel and has its body portion bent to conform to the corner. In the case of a square corner, this other bracket which may be termed a corner bracket and designated 53 has its body portion 54 bent at right angles as at 55 in Figure 7 around the corner piece 22 to conform to the corner. The body portion is secured to both the plywood section and the corner piece of the panel. The bent-over portion 56 extends only about halfway up to the joint 57 and the side panel bracket 51 is also short of the joint on the other side in order that the panels may be effectively drawn together by the clip. Where the cab has rounded corners, the corner bracket 58 is bent to conform to the corner as shown in Figure 8. In the construction there illustrated the wood corner piece is formed with a rounded inner surface 60 and an outer surface 61 of two angles of 135°. The corner piece is glued to the plywood panel section 62 with a tongue and groove joint 63. The body portion of corner bracket 58 is bent at an angle of 135° to conform to the angle of the corner piece adjacent the side panel and is secured to the corner piece. The bent portion 65 extends only about halfway up to the joint 66 and the side panel bracket 51 is also short of the joint to enable the sections to be effectively drawn together by the clip. A tongue and groove joint is provided with the groove 67 of sufficient depth to insure a tight joint. Where two flush sections are to be joined as illustrated in Figure 2, two oppositely disposed side panel brackets 51 are employed. The joinder of the canopy to the panels is effected in the manner illustrated in Figure 2. In securing two flush sections of a panel together, it may be desirable to form a double tongue and groove joint 68 as illustrated in Figure 9. Such joint may be glued as well as clamped.

With the brackets in place and the panels in assembled relation in the shop, the clips are slid in place onto the brackets and driven tight. Then with the canopy assembled on the panels, the clips are slid in place and driven tight, it being noted that these brackets are arranged to receive the clips sidewise. Any inaccuracies in construction will then become apparent and can be corrected. When this has been done, the various sections are disassembled and shipped to the job.

In assembling the cab on the job, the rear panel is placed on the car platform 70 and the side panels are secured to it. Then the front panel is secured to the side panels. The brackets are preferably provided with cuts 71 at a point to be just exposed when the clip is driven in place. Thus when the clips are forced in place, the tabs 72 formed by these cuts are bent into position over the clip to hold the clip on the brackets as illustrated in Figure 2. After the clips are forced into position, the cab is secured to the car platform 70. This is effected through angle members 73 secured to the bottom of the panels in the shop. These angles are secured to the car platform as by screws and the exposed legs 74 of the angles are covered when the finish flooring is put down.

The canopy 14 is usually suspended from the upper car framework while the panels are being assembled. When this has been effected and the panels have been secured to the car platform, the canopy is lowered into position on the panels and secured in place by the clips. When the clips are driven in place, the tabs 72 are bent over to retain the clips.

The holes 43 in the clips may be useful for various purposes. For example, where due to extremely close quarters it is difficult to slide the clips in place, they may be lowered onto the brackets with a long handled hook which is hooked through the hole 43. They may also be used instead of the tabs to secure the clips in place, as by driving a nail into the cab abutting the base side of the hole. Where after a period of operation readjustment becomes desirable which involves the further driving of one or more clips onto the brackets, new cuts can be sawed in the brackets and the new tabs bent over to hold the clip in the new position. Also, nails driven into the cab in the holes 43 may be used.

When metal canopies are employed, they are secured to the wood side panels by angle brackets and bolts. A wood canopy has been illustrated in order that it may be understood how they are secured to the panels. As previously pointed out, the representation of the cab in Figure 1 is entirely schematic and it is to be understood that it is subject to considerable variation, especially with reference to the formation of the entrance. Also where the invention is applied to structures other than elevator cabs, there may be considerable variation involved to which the joint is conformed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A joint for a pair of adjacent panels arranged at a right angle to each other, said joint being between the edge of one of said panels and the inner face of the other of said panels at the edge of said other panel and comprising; a tongue formed on said edge of said one panel, one side of said tongue being in line with the inner face of said one panel and the other side being at an obtuse angle to said edge of said one panel, said inner face of said other of said panels adjacent said edge of said other panel having a groove formed therein into which said tongue extends, the side of said groove opposite said inner face of said one panel being in line with said inner face of said one panel and the other side of said groove being at an angle conforming to that of said other side of said tongue, said groove being narrower than said tongue and thus providing clearance between said end of said tongue and the bottom of said groove and between said edge of said one panel and said inner face of said other panel outside said tongue and groove when said tongue is wedged in said groove; and clamping means on said panels securing said panels together in said tongue and groove relationship with a wedge-like action, insuring a tight fit of said panels at the point of joinder.

2. A joint for a pair of sections forming the corner of a prefabricated structure, said joint being between the edge of one of said sections and the inner surface of the other of said sections at the edge of said other section and comprising; a tongue formed on said edge of said one section, one side of said tongue being in the same plane with the inner face of said one section and the other side of said tongue being at an obtuse angle to said edge of said one section, said inner surface of said other section at said edge thereof being formed with a groove conforming to and receiving said tongue, said groove being narrower than said tongue; a pair of brackets having converging edges, one secured to the outer surface of said one section with its converging edge near and on said one section side of the line of joinder of said sections and the other secured to the outer surface of said other section and bent around said corner, bringing its converging edge near and on the other side of said line of joinder; and a clip driven onto said converging edges of said brackets, clamping said sections together with said tongue positioned in said groove.

3. A joint for a pair of adjacent panels forming the corner of an elevator cab comprising; a tongue formed on the edge of one of said panels, one side of said tongue being in line with the inner face of said one panel and the other side being at an obtuse angle to said edge of said one panel, a groove formed in the inner face of the other of said panels adjacent the edge of said other panel receiving said tongue, the side of said groove adjacent said inner face of said one panel being in line with said inner face of said one panel and the other side of said groove being at an angle conforming to that of said other side of said tongue, said groove being narrower than said tongue and thus providing clearance between said end of said tongue and the bottom of said groove and between said edge of said one panel and said inner face of said other panel outside said tongue and groove; a pair of brackets, one secured to the outer face of said one panel at said corner near and on said one panel side of the line of joinder and the other secured to the outer face of said other panel and extending around said corner to near and on the other side of said line of joinder; and a member cooperating with said brackets drawing said tongue into said groove and thus causing the forcing by said angled sides of said tongue and groove of said one side of said tongue against said side of said groove in line with said inner face of said one panel.

References Cited in the file of this patent

UNITED STATES PATENTS

| | | |
|---|---|---|
| 706,763 | Lange | Aug. 12, 1902 |
| 1,871,618 | Klopp | Aug. 16, 1932 |
| 1,919,780 | Fairbank | July 25, 1933 |
| 1,971,320 | Cederquist | Aug. 21, 1934 |
| 2,092,552 | Larrick | Sept. 7, 1937 |
| 2,142,305 | Davis | Jan. 3, 1939 |
| 2,215,076 | Ashe | Sept. 17, 1940 |

FOREIGN PATENTS

| | | |
|---|---|---|
| 204,987 | Germany | 1908 |